United States Patent
Monney et al.

(10) Patent No.: US 6,758,615 B2
(45) Date of Patent: Jul. 6, 2004

(54) PRESSURE SENSITIVE FUNCTIONALITY FOR KEYBOARD KEYS

(75) Inventors: Patrick Monney, Mex (CH); Jean-Marc Flueckiger, Lausanne (CH); Denis Pavillard, Monnaz (CH); David Lee Sandbach, London (GB)

(73) Assignees: Logitech Europe S.A. (CH); Electrotextiles Company Limited (GB)

( * ) Notice: Subject to any disclaimer, the term of this patent is extended or adjusted under 35 U.S.C. 154(b) by 0 days.

(21) Appl. No.: 10/236,191

(22) Filed: Sep. 5, 2002

(65) Prior Publication Data

US 2003/0044215 A1 Mar. 6, 2003

(30) Foreign Application Priority Data

Sep. 5, 2001 (GB) .............................................. 0121393

(51) Int. Cl.[7] .............................................. H03K 17/94
(52) U.S. Cl. ........................ 400/479; 400/477; 400/490
(58) Field of Search ................................ 400/490, 477, 400/479, 480, 481

(56) References Cited

U.S. PATENT DOCUMENTS

| | | | |
|---|---|---|---|
| 5,117,455 A | 5/1992 | Danish | |
| 5,278,557 A | 1/1994 | Stokes et al. | |
| 5,455,556 A | 10/1995 | Ohm et al. | |
| 5,617,527 A | 4/1997 | Kressin et al. | |
| 5,627,566 A | 5/1997 | Litschel | |
| 5,675,329 A | 10/1997 | Barker et al. | |
| 5,745,056 A | 4/1998 | Takahashi et al. | |
| 5,995,026 A | * 11/1999 | Sellers | ........................ 341/34 |
| 6,040,821 A | 3/2000 | Franz et al. | |
| 6,130,628 A | 10/2000 | Schneider-Hufschmidt et al. | |
| 6,135,886 A | * 10/2000 | Armstrong | .................... 463/37 |
| 6,295,052 B1 | * 9/2001 | Kato et al. | .................... 345/179 |

FOREIGN PATENT DOCUMENTS

WO    WO 00/72239 A1    11/2000

OTHER PUBLICATIONS

IBM Technical Disclosure Bulletin, "Touch Pressure Sensitive Frequency Modulated Keyboard," TDB-ACC-NO: NN78034039, vol. 20, Issue 10, pp. 4039–4040, Mar. 1, 1978.*

Keinonen et al. U.S. patent application US 2001/0006587, Jul. 5, 2001.

* cited by examiner

*Primary Examiner*—Daniel J. Colila
(74) *Attorney, Agent, or Firm*—Townsend and Townsend and Crew LLP

(57) ABSTRACT

Embodiments of the present invention are directed to a computer keyboard having a key sensing device that provides two levels of sensing by generating electrical signals depending on the force applied on the keys. The different levels of key sensing can be used to provide different functions, for instance, in a software application. This key sensing functionality can be provided on all or only some of the keys of the keyboard. For example, the different pressure levels applied on the key can be used to control cursor movement or scrolling and to produce pressure-based shifting between lower case and upper case. A method of providing pressure sensitive key functionalities for a keyboard comprises producing a signal by applying a pressure to a key which is configured to produce different signals in response to different pressure levels applied to the key. A user interface response is generated based on the signal produced by the pressure applied to the key. The different signals are adapted to generate different user interface responses for the key.

6 Claims, 1 Drawing Sheet

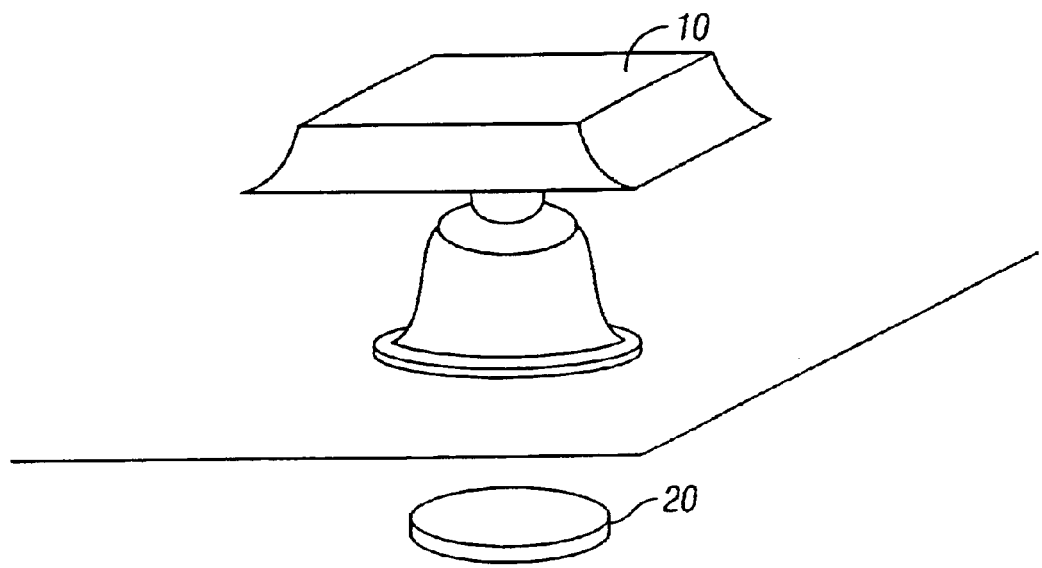

PRESSURE SENSITIVE FUNCTIONALITY FOR KEYBOARD KEYS

CROSS-REFERENCES TO RELATED APPLICATIONS

This application claims priority from United Kingdom Patent Application No. 01 21 393.3, filed Sep. 5, 2001, the entire disclosure of which is incorporated herein by reference.

BACKGROUND OF THE INVENTION

The present invention relates to keyboards and, more particularly, to a computer keyboard having pressure sensitive keys that sense the force applied on certain keys and produce a change in function or application based on the sensed force applied thereon including navigation key functionality and automatic case shifting functionality.

SUMMARY OF THE INVENTION

Embodiments of the present invention are directed to a computer keyboard having a key sensing device that provides two or more levels of sensing by generating electrical signals depending on the force applied on the keys. The different levels of key sensing can be used to provide different functions, for instance, in a software application. This key sensing functionality can be provided on all or only some of the keys of the keyboard. In one example, the key sensing feature is provided on the four scrolling keys to provide different scrolling speeds. When the force applied on a scroll key is small or normal, the scrolling occurs at a normal speed. When the force applied on the scroll key is large, the scrolling occurs at a higher speed. In other examples, the different pressure levels applied on the key can be used to control cursor movement and to produce pressure-based shifting between lower case and upper case.

In accordance with an aspect of the present invention, a method of providing pressure sensitive key functionalities for a keyboard comprises producing a signal by applying a pressure to a key which is configured to produce different signals in response to different pressure levels applied to the key. A user interface response is generated based on the signal produced by the pressure applied to the key. The different signals are adapted to generate different user interface responses for the key.

In some embodiments, the signal corresponds to a frequency of key repeats for the key. An increase in pressure produces a signal corresponding to a higher frequency of key repeats. The key may be a scroll key, and an increase in pressure produces a signal corresponding to an increase in scrolling speed. A low-pressure signal is produced by a pressure below a preset pressure and a high-pressure signal is produced by a pressure at or above a preset pressure. The low-pressure signal generates line scrolling and the high-pressure signal generates page scrolling. Alternatively, in embodiments where more than two levels of pressure can be sensed, a low pressure signal generates low speed scrolling, and successive higher pressure readings generate correspondingly higher speed scrolling actions.

In some embodiments, a low-pressure signal is produced by a low pressure below a preset pressure and a high-pressure signal is produced by a high pressure at or above a preset pressure. The key may be a cursor key, and the low-pressure signal generates a single letter cursor movement and the high-pressure signal generates a single word cursor movement. The low-pressure signal may generate a lower case character of the key and the high-pressure signal may generate an upper case character of the key. The low-pressure signal may generate a first character of the key and the high-pressure signal may generate a second character of the key.

In accordance with another aspect of the present invention, a method of providing pressure sensitive key functionalities for a keyboard, comprises producing a signal by applying a pressure to a key which is configured to produce different signals in response to different pressure levels applied to the key. A low-pressure signal is produced by a low pressure below a preset pressure and a high-pressure signal is produced by a high pressure at or above a preset pressure. The method further comprises generating a user interface response based on the signal produced by the pressure applied to the key. The different signals are adapted to generate different user interface responses for the key.

In some embodiments, the signal corresponds to a frequency of key repeats for the key, an increase in pressure producing a signal corresponding to a higher frequency of key repeats. The key may be a scroll key, and an increase in pressure produces a signal corresponding to an increase in scrolling speed. In other embodiments, the low-pressure signal generates line scrolling and the high-pressure signal generates page scrolling.

In specific embodiments, the key is a cursor key, and wherein the low-pressure signal generates a single letter cursor movement and the high-pressure signal generates a single word cursor movement. In other embodiments, the low-pressure signal generates a lower case character of the key and the high-pressure signal generates an upper case character of the key. The low-pressure signal may generate a first character of the key and the high-pressure signal may generate a second character of the key.

In some embodiments, the key is a cursor control key, and wherein the low-pressure signal generates cursor movement at a slow speed and the high-pressure signal generates cursor movement at a high speed which is higher than the slow speed.

BRIEF DESCRIPTION OF THE DRAWINGS

The Figure is a perspective schematic view of a key button and a pressure-sensitive sensor according to an embodiment of the present invention.

DESCRIPTION OF THE SPECIFIC EMBODIMENTS

Key Sensing Device

The present invention employs a pressure-sensitive key sensing device to produce different signals that correspond to two or more pressure levels. In a typical embodiment as shown in the Figure, a pressure-sensitive sensor 10 is disposed below the key button 20, and generates an output based on the pressure applied thereon by the user via the key button 20.

Examples of key sensing devices may be found in U.S. Provisional Patent Application No. 60/316,749, filed Aug. 31, 2001, entitled "Sensing Keys for Keyboard," which is incorporated herein by reference in its entirety; and U.S. patent application Ser. No. 09/744,155, entitled "Foldable Five Layer Fabric," (corresponding to EP Application No. 00 925473.1, Publication No. 1 099 190, published May 16, 2001) which is incorporated herein by reference in its entirety.

To achieve pressure-sensitive key sensing, U.S. Provisional Patent Application No. 60/316,749 discloses the use of force sensors disposed directly below the key button such as, for example, a force-sensing resistor, a capacitance-based sensor, or pairs of conductive contacts spaced by differently sized apertures.

U.S. patent application Ser. No. 09/744,155 (EP Application No. 00 925473.1, Publication No. 1 099 190) discloses a fabric sensor, which is placed directly below the key button. In one embodiment, signals related to position, and to pressure are available from the control electronics that accompany the sensor, in the form of x, y and z-axis readings, wherein x and y readings correspond to position of a mechanical interaction, and z-axis readings relate to the applied pressure on the sensor. Z-axis readings are interpreted by the keyboard software, depending on their level, as indicative of more than two different levels of pressure, which in turn control the speed of repeat key characters sent to a processing device by the keyboard.

Key Sensing Functionalities

The key sensing device may be used to achieve different pressure sensitive functionalities for certain keys on the keyboard. A few examples are described herein. It is understood, however, that these examples are merely illustrative and do not limit the present invention.

One example involves the use of pressure sensitive navigation keys to control the speed of key repeats. A light pressure produces slow key repeats, while a high pressure produces fast key repeats. This can be applied to slower or faster scrolling. For a scroll key, the pressure data (or position change data) can be used to differentiate between line scrolling (as produced by a light pressure or a small movement) and page scrolling (as produced by a high pressure or a large movement). The change in speed is related to the variation in pressure. For a cursor control key, a light pressure can produce a single letter cursor movement, while a high pressure can produce a single word cursor movement.

In a conventional keyboard using mechanical switches to signal the keys pressed, the auto repeat function operates at a fixed rate, usually selected from a menu, and applied to all subsequent keystrokes. The problem with this is that it must be set to relatively slow rate if it is to be used to backspace and stop on a given character. At this slow rate, it may take too long to approach the stop position such that it would be quicker to use another means to move the cursor, such as a mouse or other input device.

The present invention provides a way of changing the repeat speed during a keystroke to allow fast approach to the required stopping position with a final adjustment of the position at a slow rate. The rate of auto repeat is controlled by the pressure of the key press and is adjusted dynamically for each repeat character in the auto repeating sequence. This way of producing faster repeat at a higher pressure is very intuitive in use. In addition to being able to offer a faster rate of repeat of characters, the precision with which the pressed position is sensed has been maintained. This can be done because the readings of X and Y settle more quickly at a higher pressure (bigger Z values) so the sample time can be reduced. Conversely, at low repeat rates and low pressures, the sampling time has been extended to improve the accuracy of the X and Y measurements. This has led to an overall increase in the speed of response of the keyboard as the first X and Y data, at the beginning of a keystroke, is being reliably sampled at a lower pressure.

In another example of a scroll key positioned above a sensor such as a fabric sensor, three z-axis reading thresholds are set in software. Values for these thresholds can be modified by the user in a set-up screen. At z-axis readings below the lowest threshold, the slowest key repeat rate, and hence scroll speed is activated. Above the lowest threshold, the next faster level of key repeat and hence scroll speed is activated, and so on. In this way, four successively faster scroll speeds can be controlled by the user pressing the scroll key with successively firmer pressure.

In another example, the pressure sensitive feature of the key sensing device is used to shift between upper and lower case or to shift between two different characters. A light pressure produces a lower case character or a first character, while a high pressure produces an upper case character or a second character. This eliminates the need to press a shift key simultaneously with the character key to produce the upper case character. This is particularly beneficial for use in keyboards that do not lend themselves to simultaneous key sensing, such as keyboards that operate on a resistive array of key sensing.

These pressure sensitive functionalities may be implemented in software in response to the different signals produced by the different pressure levels of key sensing, as known to a person of skill in the art.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A method of providing pressure sensitive key functionalities for a keyboard, comprising:

producing a signal by applying a pressure to a key which is configured to produce different signals in response to different pressure levels applied to the key, wherein a low-pressure signal is produced by a low pressure below a preset pressure and a high-pressure signal is produced by a high pressure at or above a preset pressure; and generating a user interface response based on the signal produced by the pressure applied to the key, the different signals being adapted to generate different user interface responses for the key, wherein the key is a cursor key, and wherein the low-pressure signal generates a single letter cursor movement and the high-pressure signal generates a single word cursor movement.

2. The method of claim 1 wherein the signal corresponds to a frequency of key repeats for the key, an increase in pressure producing a signal corresponding to a higher frequency of key repeats.

3. The method of claim 1 wherein the single letter cursor movement at the low pressure is at a speed which increases with the pressure applied to the key, and wherein the single word cursor movement at the high pressure is at a speed which increases with the pressure applied to the key.

4. A method of providing pressure sensitive key functionalities for a keyboard, comprising:

producing a signal by applying a pressure to a key which is configured to produce different signals in response to different pressure levels applied to the key, wherein a low-pressure signal is produced by a low pressure below a preset pressure and a high-pressure signal is produced by a high pressure at or above a preset pressure; and generating a user interface response based on the signal produced by the pressure applied to the key, the different signals being adapted to generate different user interface responses for the key;

wherein the key is a scroll key, wherein the low-pressure signal generates line scrolling and the high-pressure signal generates page scrolling.

5. The method of claim 4 wherein an increase in pressure produces a signal corresponding to an increase in line scrolling speed at the low pressure and to an increase in page scrolling speed at the high pressure.

6. The method of claim 4 wherein the signal corresponds to a frequency of key repeats for the key, an increase in pressure producing a signal corresponding to a higher frequency of key repeats.

* * * * *